(12) United States Patent
Oost

(10) Patent No.: US 6,628,203 B1
(45) Date of Patent: Sep. 30, 2003

(54) COMMUNICATION OF DEVICE-RELATED INFORMATION AFTER ASSEMBLY

(75) Inventor: Albert Oost, Erica (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 395 days.

(21) Appl. No.: 09/688,690

(22) Filed: Oct. 17, 2000

(51) Int. Cl.[7] .............................................. G08B 21/00
(52) U.S. Cl. ...................... 340/635; 340/531; 340/500; 340/641
(58) Field of Search ............................ 340/635, 636, 340/641, 531, 679, 500, 657

(56) References Cited

U.S. PATENT DOCUMENTS

| 5,218,466 A | | 6/1993 | Brooks | |
|---|---|---|---|---|
| 5,465,038 A | | 11/1995 | Register | |
| 5,670,942 A | * | 9/1997 | Lewis | .......................... 340/555 |
| 5,865,733 A | * | 2/1999 | Malinouskas et al. | ........ 600/300 |
| 6,014,236 A | * | 1/2000 | Flaherty | ....................... 359/118 |
| 6,188,496 B1 | * | 2/2001 | Krishna et al. | .............. 359/177 |

FOREIGN PATENT DOCUMENTS

| EP | 0 748 067 A1 | 11/1996 |
|---|---|---|
| WO | 99/42984 | 8/1999 |

* cited by examiner

*Primary Examiner*—Toan Pham
(74) *Attorney, Agent, or Firm*—Burns, Doane, Swecker & Mathis L.L.P.

(57) ABSTRACT

Device-related information is communicated from a device to external equipment, such as test equipment as part of final production of the device. This is done by generating a modulated signal (e.g., by pulse code modulation) that represents the device-related information, and supplying the modulated signal to an indicator light in the device, whereby the indicator light generates a modulated light signal that conveys the device-related information. The indicator light may be a light emitting diode that, during normal operation of the device, indicates a status condition of the device, such as whether the device is on or off.

30 Claims, 1 Drawing Sheet

COMMUNICATION OF DEVICE-RELATED INFORMATION AFTER ASSEMBLY

BACKGROUND

The present invention relates to electronic equipment, and more particularly, to methods and apparatuses that enable electronic equipment to communicate information about itself after it has been assembled.

When electronic equipment is being manufactured, it is not uncommon for testing to be performed on various components as production progresses. As a last step in production, the equipment is mounted in a housing, and a final test is performed to ensure that the equipment is functioning properly. In many instances, this poses no problem because the units being manufactured are identical to one another, so that the same steps are performed during final test from one unit to the next.

In some cases, however, the devices being manufactured are not identical to one another, even though they may nominally perform the same function. For example, some devices may differ from one another with respect to how much memory they have installed, and/or what level of performance can be expected from an installed processor or other component. In other examples, devices may differ from one another even if they are built from identical components.

One such example is a wireless headset such as the one described in U.S. patent application Ser. No. 09/619,530, filed on Jul. 19, 2000 entitled "Reconfigurable Headset Switch", the entire disclosure of which is hereby incorporated by reference. The headset described in the referenced U.S. patent application establishes a wireless connection between itself and its associated device, which may be for example a telephone (e.g,. a cellular telephone). The wireless connection may be supported by radio technology, such as BLUETOOTH™-compatible technology. More information about the BLUETOOTH™ wireless technology specification can be found on the Internet at www.bluetooth.com. BLUETOOTH is a trademark owned by Telefonaktiebolaget LM Ericsson, Sweden.

BLUETOOTH™ technology permits a plurality of devices to establish ad hoc networks with one another, as needed. To distinguish one unit from the next over the radio network, each unit is associated with a unique identification number or address. This unique address information is stored within each device. Consequently, equipment such as the above-mentioned wireless headset may differ from one unit to the next in that each has a different address stored therein. This can pose a problem during the final testing of the unit, since it is necessary for the testing apparatus to know the address information of the unit under test before it can attempt to establish a wireless connection with the unit.

A number of techniques are known for providing the device-related information (e.g., the unique address information in the case of the above-mentioned wireless headset) to the testing apparatus. One such solution includes putting a bar code label onto the device, wherein the bar code contains the device-related information. The test equipment can then include a bar code scanner for reading the necessary information off of each device under test. A problem with this solution is that there is often no room on the device under test for a bar code label. For example, the above-mentioned wireless headset is a very compact device that does not offer much surface area for placement of a bar code label.

Another conventional solution includes providing an extra electrical connector on the device. A cable from the test equipment is connected to the extra connector, and the information is communicated from the device under test to the test equipment using known communication techniques. A problem with this solution is that the hardware necessary to support the extra connector (including the extra connector itself) often makes the device heavier and costlier. In a small, portable device, this can be a serious drawback.

Yet another conventional solution involves using communication equipment that is already built into the device under test. For example, in the case of the above-referenced wireless headset, it is known that BLUETOOTH™ equipment is installed. It is then possible to design the device in such a way that the BLUETOOTH™ radio equipment can be utilized to communicate the device-related information from the device under test to the test equipment. This solution, too, has its drawbacks, most notably the slow communication speed afforded by the BLUETOOTH™ connection.

There is, therefore, the need to provide methods and apparatuses that enable a device to communicate its device-related information to external equipment.

SUMMARY

It should be emphasized that the terms "comprises"and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses that communicate device-related information from a device to external equipment. This is done by generating a modulated signal that represents the device-related information; and supplying the modulated signal to an indicator light in the device, whereby the indicator light generates a modulated light signal that conveys the device-related information. The type of modulation may be, for example, pulse code modulation. In some embodiments, the modulated signal conveys information at a rate of 1200 baud, although this is not an essential feature of the invention.

In some embodiments, the indicator light is a light emitting diode, although this is not essential to the invention.

It is advantageous, when practicing the invention, to use an indicator light that, during normal operation of the device, is used to indicate a status condition of the device. The status information may be, for example, an on/off condition of the device.

In another aspect of the invention, the device-related information may be address information that is used in establishing ad hoc radio connections with other devices. This may be useful where the ad hoc radio connections are, for example, BLUETOOTH™ connections.

In alternative embodiments, the device-related information may be a serial number of the device; a software version level of software loaded in the device; a production date of the device. In still other alternative embodiments in which the device is battery charger, the device-related information may alternatively be charger status information or an indication of an amount of charging current.

The invention is useful in many types of devices, including but not limited to wireless headsets and battery chargers.

BRIEF DESCRIPTION OF THE DRAWINGS

The objects and advantages of the invention will be understood by reading the following detailed description in conjunction with the drawings in which.

DETAILED DESCRIPTION

Figure 1:
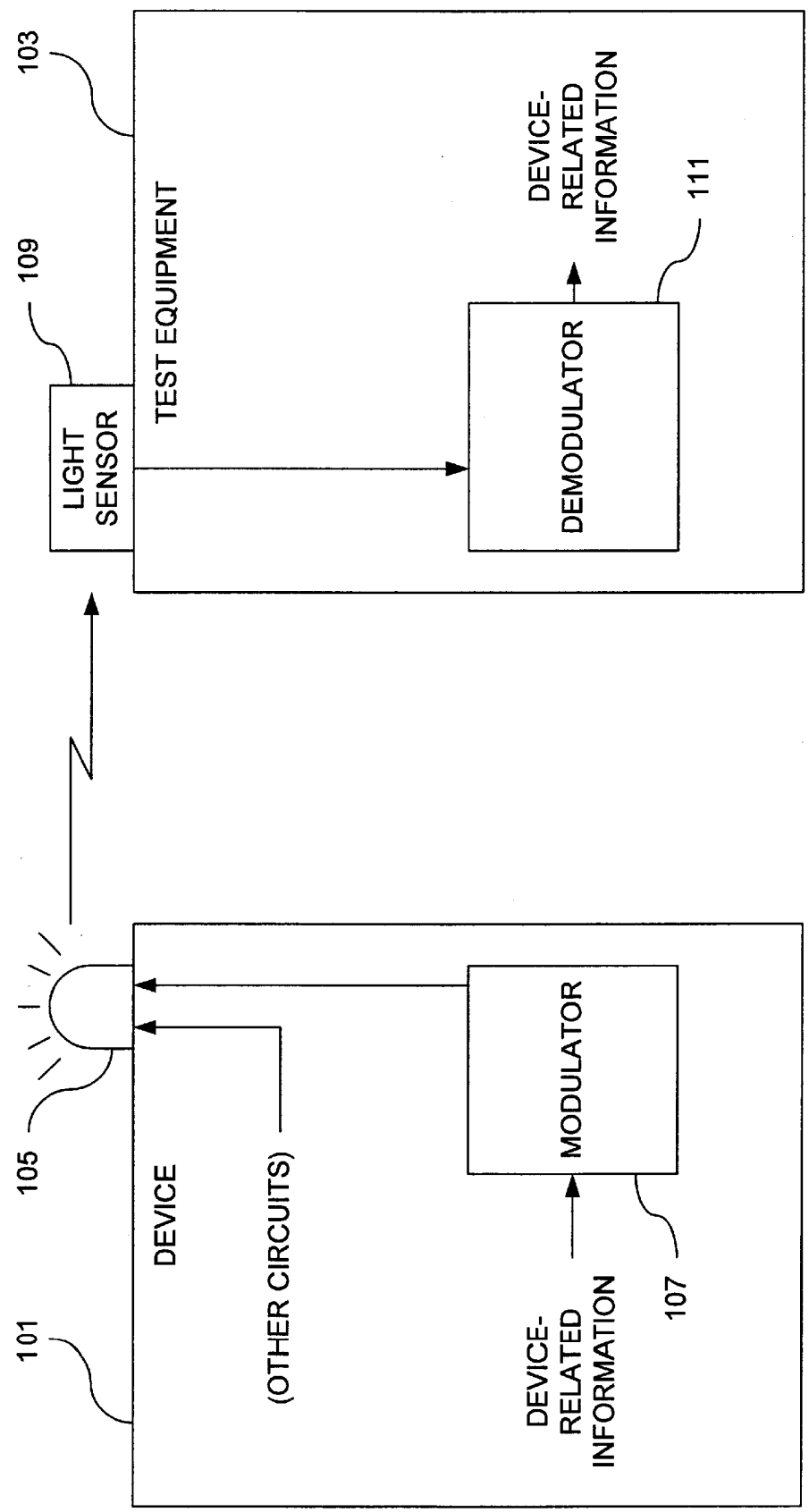
FIG. 1 is a block diagram of an exemplary arrangement of the invention.

The various features of the invention will now be described with respect to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, optical disk or carrier wave (such as radio frequency, audio frequency or optical frequency carrier waves) containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action, or alternatively as "logic that" performs a described action.

The invention is based on the inventor's observation that many of the devices that need to communicate device-related information to an external apparatus include some sort of indicator light, such as a Light Emitting Diode (LED), that is used to indicate a status condition of the device, such as On/Off. In accordance with the invention, a controller operates the indicator light in such a manner that the device-related information is modulated onto the light that is emitted from the indicator light. To receive this information, the external apparatus is equipped with a suitable optical reader, which detects the light and demodulates it.

FIG. 1 is a block diagram of an exemplary arrangement of the invention. A device 101 includes device-related information (e.g., a device identification number or address) that needs to be communicated to external equipment, such as the illustrated test equipment 103. The device-related information may be stored in a memory device (not shown) within the device 101, or may alternatively be dynamically generated by other circuitry (not shown) within the device 101. The device also includes an indicator light 105 that, during normal operation of the device 101, indicates one or more status conditions pertinent to the device 101. The indicator light 105 may be, for example, an LED that emits visible light (e.g., red or green).

The status conditions normally indicated by the indicator light 105 may include, for example, an indication of whether the device 101 is powered on or off. For this purpose, the indicator light receives controlling signals that may emanate from one or more other circuits (not shown) within the device 101.

In accordance with the invention, the indicator light 105 is also used to communicate device-related information. To support this function, the device 101 further includes a modulator circuit 107 that receives the device-related information, and generates control signals that cause the indicator light 105 to generate a modulated light signal, wherein the modulated light signal carries the device-related information. The device 101 can be designed to flash the device-related information one or more times whenever the device 101 is powered on. In practice, the modulation would be at a high enough rate (e.g., 1200 baud) that the human eye would see only a very short flash—there is no way that the human eye would see that the flash contains data. Alternatively, if it is desired not to expend power on this function needlessly (e.g., after the device has been placed into the hands of the consumer), the device 101 can be designed to flash the information only a first number of times that it is powered on, that is, only during those times when the device is expected to undergo an initial product test.

To receive the device-related information, external equipment such as the illustrated test equipment 103 includes a light sensitive device 109. The light sensitive device 109 detects the modulated light signal emanating from the device indicator light 105 and generates a corresponding modulated signal within the test equipment 103. The modulated signal is supplied to a demodulator circuit 111 within the test equipment 103. The demodulator circuit 111 demodulates the modulated signal to reproduce the device-related information, which can then be supplied to other circuitry (not shown) within the test equipment 103.

Circuitry for modulating and demodulating a light signal are known, and need not be described here in detail. For example, Pulse Code Modulation (PCM) can be used to superimpose a binary form of the device-related information onto the light that emanates from the indicator light 105.

The above-described technique for communicating device-related information from a device to external equipment has a number of advantages. First, it is able to communicate information relatively quickly. For example, a BLUETOOTH™ address, comprising a 12 digit hexadecimal number, can be communicated within a second where the modulator 107 is operating at 1200 baud. By comparison, use of the BLUETOOTH™ technology itself to communicate this same information over a radio link can take up to 15 seconds because a cumbersome inquiry protocol must be followed.

Another advantage of the invention is that it does not require extra hardware costs.

Yet another advantage of the invention is that it also functions as a test of the indicator light 105. That is, if the device-related information is successfully communicated from the device 101 to the test equipment 103, it means that the indicator light 105 is functioning properly. This saves having to test the indicator light 105 by other means, such as by visual inspection.

The invention has been described with reference to a particular embodiment. However, it will be readily apparent to those skilled in the art that it is possible to embody the invention in specific forms other than those of the preferred embodiment described above. This may be done without departing from the spirit of the invention.

For example, the invention has been described with respect to a device that needs to communicate device-related information to external equipment. It is emphasized that the invention may be applied to any sort of equipment needing to communicate any device-related information, and is not limited to the examples give above. For example, in addition to the above-described examples (including a wireless headset that employs BLUETOOTH™ technology), the inventive techniques can be applied to enable a microprocessor within a power supply (e.g., a telephone charger) to utilize its indicator light to communicate information about the charger status or the charging current. These and other devices can also employ the inventive techniques to inform external equipment of an internally-stored serial number, software version and/or production date.

By utilizing the above-described techniques, the use of extra plugs or connections can be avoided, and the servicing of equipment can be made more easily and quicker.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of communicating device-related information from a device to external equipment, the method comprising:

generating a modulated signal that represents the device-related information; and supplying the modulated signal to an indicator light in the device, whereby the indicator light generates a modulated light signal that conveys the device-related information.

2. The method of claim 1, wherein the step of generating a modulated signal comprises using pulse code modulation to generate the modulated signal that represents the device-related information.

3. The method of claim 1, wherein the indicator light is a light emitting diode.

4. The method of claim 1, further comprising using the indicator light during normal operation of the device to indicate a status condition of the device.

5. The method of claim 4, wherein the status condition is an on/off condition.

6. The method of claim 1, wherein the device-related information is address information that is used in establishing ad hoc radio connections with other devices.

7. The method of claim 6, wherein the ad hoc radio connections are BLUETOOTH™ connections.

8. The method of claim 1, wherein the device-related information is a serial number of the device.

9. The method of claim 1, wherein the device-related information is a software version level of software loaded in the device.

10. The method of claim 1, wherein the device-related information is a production date of the device.

11. The method of claim 1, wherein the device is a battery charger, and the device-related information is charger status information.

12. The method of claim 1, wherein the device is a battery charger, and the device-related information indicates an amount of charging current.

13. The method of claim 1, wherein the modulated signal conveys information at a rate of 1200 baud.

14. The method of claim 1, wherein the device is a wireless headset.

15. The method of claim 1, wherein the device is a battery charger.

16. An apparatus for communicating device-related information from a device to external equipment, the apparatus comprising:

a modulator circuit that generates a modulated signal that represents the device-related information; and logic that supplies the modulated signal to an indicator light in the device, whereby the indicator light generates a modulated light signal that conveys the device-related information.

17. The apparatus of claim 16, wherein the modulator circuit comprises logic that uses pulse code modulation to generate the modulated signal that represents the device-related information.

18. The apparatus of claim 16, wherein the indicator light is a light emitting diode.

19. The apparatus of claim 16, further comprising logic that uses the indicator light during normal operation of the device to indicate a status condition of the device.

20. The apparatus of claim 19, wherein the status condition is an on/off condition.

21. The apparatus of claim 16, wherein the device-related information is address information that is used in establishing ad hoc radio connections with other devices.

22. The apparatus of claim 21, wherein the ad hoc radio connections are BLUETOOTH™ connections.

23. The apparatus of claim 16, wherein the device-related information is a serial number of the device.

24. The apparatus of claim 16, wherein the device-related information is a software version level of software loaded in the device.

25. The apparatus of claim 16, wherein the device-related information is a production date of the device.

26. The apparatus of claim 16, wherein the device is a battery charger, and the device-related information is charger status information.

27. The apparatus of claim 16, wherein the device is a battery charger, and the device-related information indicates an amount of charging current.

28. The apparatus of claim 16, wherein the modulated signal conveys information at a rate of 1200 baud.

29. The apparatus of claim 16, wherein the device is a wireless headset.

30. The apparatus of claim 16, wherein the device is a battery charger.

* * * * *